(12) United States Patent
Plummer

(10) Patent No.: US 8,325,385 B2
(45) Date of Patent: Dec. 4, 2012

(54) SYSTEM AND METHODS FOR PROCESSING COLOR DATA IN CONVERTING COLOR DATA FROM ONE COLOR SPACE TO ANOTHER COLOR SPACE

(75) Inventor: Todd Plummer, Estes Park, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 853 days.

(21) Appl. No.: 12/413,428

(22) Filed: Mar. 27, 2009

(65) Prior Publication Data

US 2010/0245857 A1    Sep. 30, 2010

(51) Int. Cl.
*G06F 15/00* (2006.01)
*G06K 9/00* (2006.01)

(52) U.S. Cl. ........ 358/1.9; 358/2.1; 358/1.13; 358/1.14; 358/1.15; 358/3.01; 358/3.02; 358/504; 358/518; 358/520; 358/523; 358/527; 358/535; 382/162; 382/167; 382/276; 382/283; 345/589; 345/590; 345/591; 345/593; 345/600; 345/601; 345/604; 345/690

(58) Field of Classification Search .................. None
See application file for complete search history.

(56) References Cited

U.S. PATENT DOCUMENTS

| | | | |
|---|---|---|---|
| 5,502,580 A * | 3/1996 | Yoda et al. | 358/518 |
| 7,369,271 B2 * | 5/2008 | Itagaki | 358/1.9 |
| 7,453,601 B2 * | 11/2008 | Kurumisawa et al. | 358/1.9 |
| 7,633,658 B2 * | 12/2009 | Tsuji | 358/518 |
| 7,813,000 B2 * | 10/2010 | Ternasky et al. | 358/1.9 |
| 8,073,728 B2 * | 12/2011 | Beabes et al. | 705/7.35 |
| 2005/0225785 A1 * | 10/2005 | Hiramatsu | 358/1.9 |
| 2007/0035752 A1 * | 2/2007 | Evans et al. | 358/1.9 |

* cited by examiner

*Primary Examiner* — Steven Kau

(74) *Attorney, Agent, or Firm* — Finnegan, Henderson, Farabow, Garrett & Dunner, L.L.P.

(57) ABSTRACT

Systems and methods are provided for processing at least one document comprising color data. Color data in the document in a first color space is inspected to determine if a color space conversion operation for a portion of the color data is specified using a color space dictionary or a transformation matrix, wherein the color space conversion operation converts the color data from the first color space to an intermediate standard color space. An input profile corresponding to the color conversion operation is generated, wherein the input profile comprises information to convert color data from the first color space to the intermediate standard color space; and color space conversion operations are performed on the color data using the generated input profile to convert the color data from the first color space to the intermediate standard color space.

22 Claims, 4 Drawing Sheets

SYSTEM AND METHODS FOR PROCESSING COLOR DATA IN CONVERTING COLOR DATA FROM ONE COLOR SPACE TO ANOTHER COLOR SPACE

TECHNICAL FIELD

This disclosure relates to the field of graphics and color management, and in particular to systems and techniques for processing color data.

DESCRIPTION OF THE RELATED ART

Graphical output devices that deal with the reproduction of color images typically have a range of colors that can be accurately rendered by the device. These colors may be specified in a color space native to the output device when rendered, but may be input from a device that uses a different color space. When colors represented by one color space in a source (or input) device are converted to another color space in a target (or output) device, some mechanism to translate colors accurately between the two color spaces is used. For a given target, there may be a large number of source color spaces. For example, a printer may receive input from various graphics software running on a computer, a digital camera, and/or other devices or programs. Typically, in a system with multiple color processing devices, color conversion between the various color spaces is facilitated by first converting colors from any of the source color spaces to a selected intermediate standard color space, and then, from that standard color space to the color space of the target device. The intermediate standard color space is typically a device independent color space.

Some standard color spaces such as, for example, color spaces defined by the Commission Internationale de l'Eclairage XYZ (CIE XYZ) color space, can be used to specify colors in a device independent manner. In the CIE XYZ color space, the range of colors that are visually perceptible to the human eye can be modeled mathematically using a device independent model, in which colors may be unambiguously specified without reference to external factors. Thus, the CIE XYZ color space is often selected as the intermediate color space.

In some instances, color conversion to the intermediate color space may involve multiple calculations using a color space dictionary and may also involve a color transformation matrix. In other situations, color conversion to and from an intermediate color space, such as CIE XYZ, is defined by "color profiles" for the source and target devices. Therefore, the intermediate color space is also often called a profile connection space. The color profile comprises a data set that is often specified in terms of standards promulgated by the International Color Consortium (ICC). The data set in the color profile can provide a device-specific, a user-specified, or a rendering-intent based characterization of a color input or output device that permits translation of colors to or from the PCS.

Because of the various approaches that have been adopted for color transformation to the intermediate color space, there can be separate code pathways to deal with conversion from the different input color spaces to the intermediate standard color space, thereby contributing to increased complexity in the color conversion process. Complexity in the color conversion process can lead to increased deployment and maintenance costs, increase the probability of bugs, and make the code more difficult to optimize. Therefore, there is a need for systems and methods to permit efficient conversion of commonly occurring input color spaces into PCS.

SUMMARY

Consistent with the present disclosure, systems and methods provide a processor-implemented method for processing at least one document comprising color data in a first color space, the method comprising the processor-implemented steps of: inspecting the color data to determine if a color space conversion operation for the color data is specified using at least one of a color space dictionary or a transformation matrix, wherein the color space conversion operation converts the color data from the first color space to an intermediate standard color space; generating an input profile for the color conversion operation, wherein the input profile comprises information to convert color data from the first color space to the intermediate standard color space; and performing the color space conversion operations on the color data from the first color space to the intermediate standard color space using the generated input profile.

Embodiments of the present invention also relate to software, firmware, and program instructions created, stored, accessed, or modified by processors using computer-readable media or computer-readable memory. The methods described may be performed on a variety of computing devices, and peripherals, including printing devices.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
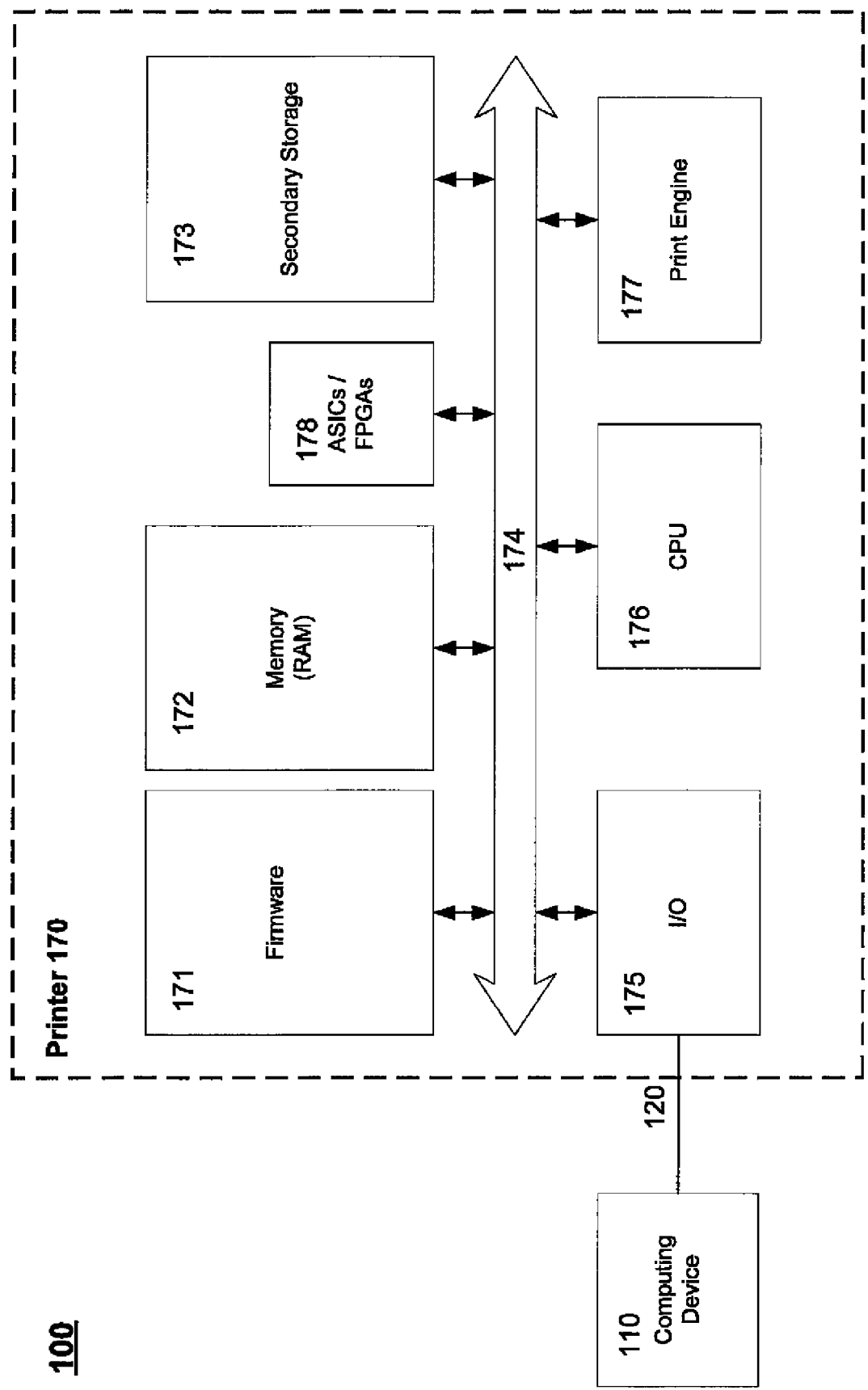
FIG. 1 illustrates an exemplary block diagram of a system using a computing device, which may be a source device for color data, coupled to a target output device, which is shown as an exemplary printer.

FIG. 1 illustrates an exemplary block diagram of a system 100 using a computing device 110, which may be a source device for color data, coupled to a target output device, which is shown as exemplary printer 170. Note that, in general, the methods disclosed may be performed or implemented on any graphic processing device that is capable of performing color conversion operations including computing device 110, exemplary printer 170, and/or other devices that perform color space conversions, color management, and/or color translations.

In some embodiments, these devices may receive input in a first color space and produce output in a second color space, which in some instances may be different from the first color space. The methods and apparatus described in this document may also be applied to the above device types with appropriate modifications and in a manner consistent with embodiments disclosed herein as would be apparent to one of ordinary skill in the art. In some embodiments, data in a first color space may be output by one software application and input to another downstream software application, which may process data in a different color space and perform color conversions on its input data. For simplicity and ease of explanation, however, the methods are described with reference to exemplary computing device 110 as the source and exemplary printer 170, as the target device.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have image transmitting/receiving function, image scanning function, and/or copying function, as installed in facsimile machines and digital copiers. The methods and apparatus described in this document may also be applied to these various printer device types with appropriate modifications and in a manner consistent with embodiments disclosed herein.

In some embodiments, printer 170 may contain one or more input-output ports 175, and printer 170 may be able to communicate with and access resources on computing device 110 using I/O ports 175 and connection 120. Printer 170 may receive input print data, including color and other print data, from computing device 110. For example, computing device 110 may be a general purpose computer that can include a monitor to display data, which in some cases may be sent to printer 170 for printing.

Computing device 110 may be capable of running various applications including document processing software, which may generate documents with color or grayscale data in various color spaces. Computing device 110 and/or applications running on computing device 110 may use one color space to represent the input color data. For example, color spaces may be specified using formats specified by Adobe's Portable Document Format (PDF™) and/or PostScript™ page description languages, which may be sent to printer 170 for output. In some embodiments, these color spaces may also include device-independent CIE-based color spaces such as CIEBasedA, CIEBasedABC, CIEBasedDEF, of CIEBasedDEFG (hereinafter referred to collectively as CIEBased) in PostScript™, or CalGray, CalRGB, Lab in PDF version 1.2 or earlier, and ICCBased in PDF version 1.3 and later. In PDF, for example, individual color spaces can be specified by means of dictionaries and/or transformation matrices containing the parameter values needed to define the space. In some embodiments, computing device 110 may also take the form of an image generating device such as a digital camera.

Printer 170, on the other hand, may use a color space native to printer 170 such as a CMY color space, a CMYK color space, or some other type of color space to represent color data prior to printing. In some embodiments, the native color space of printer 170 may not match the input color space of computing device 110.

In conventional (existing) systems, a series of steps is often performed to convert the data in the input color space to the native color space of printer 170 prior to printing. For example, in conventional systems, a transform, which can use the color space dictionary, and/or a transformation matrix, can map the colors from the source color space (e.g. CalGray, CalRGB, or CIEBased) to the selected intermediate standard color space (e.g. CIE-XYZ), which may be a device independent color space. The intermediate color space is then converted subsequently to the native color space of printer 170.

In conventional systems, if the source color space is specified as ICCBased then a separate code pathway is invoked. ICCBased color spaces are based on a cross-platform color profile specified by the ICC. Unlike the CalGray, CalRGB, and CIEBased color spaces, which are characterized by entries in the color space dictionary, an ICCBased color space is characterized by a sequence of bytes in a standard profile format. Accordingly, in conventional systems, separate code is typically invoked when processing color space data using ICCBased profiles to convert the input data to the intermediate selected standard color space, which in the case of ICCBased profiles corresponds to a PCS. For example, in conventional systems, ICCBased data in the input color space may be converted to the PCS using the input profile.

Consistent with embodiments disclosed herein, system 100 may process input color space data using a common code pathway for CalGray, CalRGB, CIEBased, Lab, and ICCBased color spaces. The use of a common code pathway to transform the various color spaces to the selected standard color space simplifies code maintenance, can accelerate code deployment, and permits greater exploitation of code and performance optimizations.

Computing device 110 may be coupled to printer 170 via a wired or wireless connection 120 using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. The data port may be a wired or wireless port.

Printer 170 may further include bus 174 that couples CPU 176, firmware 171, memory 172, print engine 177, and secondary storage device 173. Printer 170 may also include other Application Specific Integrated Circuits (ASICs), and/or Field Programmable Gate Arrays (FPGAs) 178 that are capable of executing portions of an application to perform color space conversions, gamut mapping, color translations, and other color management routines in a manner consistent with disclosed embodiments. In some embodiments, printer 170 may also be capable of executing software including a printer operating system and other appropriate application software, including software to perform color management functions.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including, but not limited to, a boot-up sequence, pre-defined routines, routines to perform color management, including color space conversions, luminance computations, look-up tables, and other code. In some embodiments, code and data in firmware 171 may be copied to memory 172 prior to being acted upon by CPU 176. In some embodiments, data and instructions in firmware 171 may be upgradeable.

In some embodiments, firmware 171 may also include routines to perform color space conversion related computations, and store the values in memory 172. When color space conversions are performed colors may be converted from an input color space to an output color space. In some embodiments, the color space conversion process may involve conversions from the input color space to one or more intermediate color spaces prior to conversion to an output color space. In some embodiments, the routines may include code that can be executed by CPU 176 and/or computing device 110 to perform portions of computations related to pre-processing color space information in print data. For example, CalGray, CalRGB, or CIEBased color space data may be pre-processed by computer 110. Routines in firmware 171 may also include code to process the input color data and related color space information received from computing device 110.

It is also contemplated that portions of routines to perform one or more color management related computations may be stored on a removable computer readable medium, such as a hard drive, computer disk, CD-ROM, DVD ROM, CD±RW or DVD±RW, USB flash drive, memory stick, or any other suitable medium, and may run on any suitable subsystem of printer 170. For example, portions of applications to perform computations related to color space processing may reside on a removable computer readable medium and be read and acted upon by CPU 176 using routines in firmware 171 that have been copied to memory 172.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and color conversion algorithms.

In some embodiments, input color data, color space dictionaries, transformation matrices, an input color profile, native color profile, computed look-up tables, and converted color data may be stored in memory 172 or secondary storage 173. An input color profile can describe input color data 210 (FIG. 2) for the purposes of converting the data to the intermediate standard color space, while a native color profile can describe the color behavior of the print engine 177 when converting data from the intermediate standard color space to the native color space of printer 170. Exemplary secondary storage 173 may be an internal or external hard disk, Memory Stick™, a flash drive, an SDHC card, or any other memory storage device capable of being used in an/or coupled to printer 170. Memory to store computed values and look-up tables may be a dedicated memory or form part of a general purpose memory, or some combination thereof according to some embodiments of the present invention. In some embodiments, memory may be dynamically allocated and de-allocated when holding and releasing data structures and memory objects.

Figure 2:
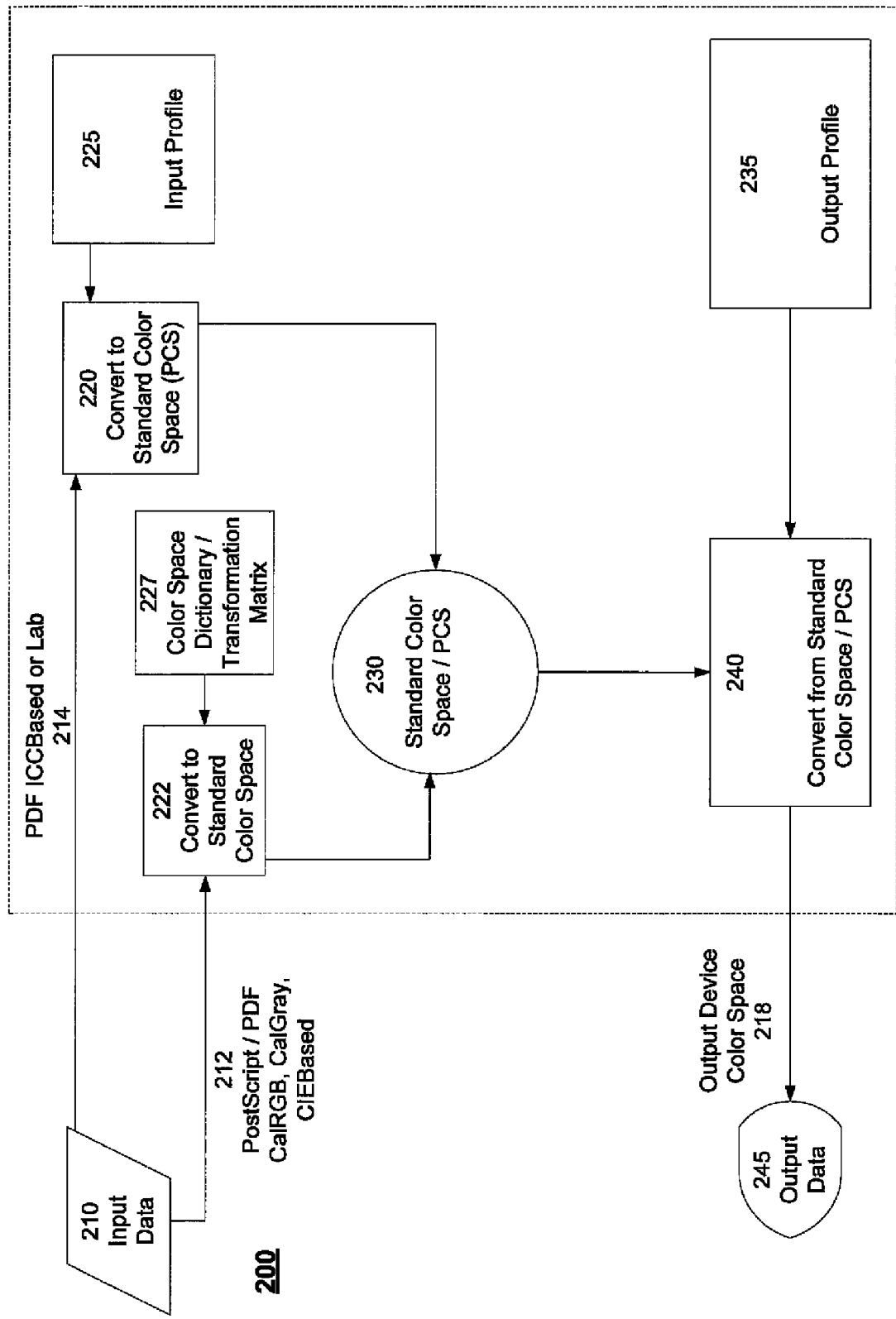
FIG. 2 shows a block diagram indicating an exemplary data flow for color conversion in conventional systems.

FIG. 2 shows a block diagram 200 indicating an exemplary data flow for color conversion in conventional systems. In conventional systems, the functions in steps 220 through 240 are typically implemented and performed by a Color Management Module ("CMM") in a printer, which may be part of a color management system such as Microsoft Windows™ Color System (WCS).

Input data 210 in an input color space may be converted to an intermediate standard color space in step 220. For example, if input data is in the CalGray, CalRGB, or CIE-Based color spaces 212 in PDF or PostScript, then the CalGray, CalRGB, or CIEBased color space data 212 is converted to the intermediate standard color space 230 by conversion module 222 using information in color space dictionary and/or transformation matrix 227. On the other hand, if the color space of the input data is ICCBased or Lab 214, then the ICCBased or Lab data 214 is converted to the intermediate standard color space 230, which is the Profile Connection Space here, using color space conversion module 220 and input profile 225.

The input profile 225 typically includes an ICC specification and additional related information to convert color data to the intermediate standard color space, or PCS 230. The ICC profile format supports a variety of device-dependent and device-independent color spaces, including, for example, CIE XYZ based color spaces, RGB based color spaces, and CMYK based color spaces. Input profile 225 may be stored in memory 172 or secondary storage 173 of printer 170 and/or in computing device 110. In some embodiments, input color profile 225 may include the detailed ICC specification of the input color space. Input profile 225 may provide device specific color space definitions that may permit fine tuning of a generic color space conversion routine in step 220, thereby facilitating more color accurate PCS conversions of input data 210.

Input profile 225 may be used to facilitate color transformations to PCS using information in the profile such as look-up tables, matrices, and/or parametric curves. Input profile 225 constitutes an open specification of the color expected from encoded data in a digital image. Thus, input profiles 225 permit the transformation of the device dependent input color specification to an intermediate standard device independent PCS 230, such as CIE-XYZ.

Standard color space 230 may then be converted to output device color space 218 using color conversion module 240 and output profile 235. For example, data may be converted from intermediate standard color space 230, which can be CIE-XYZ, to the output device color space 218, which can be CMYK for a printer. Output data 245 in the destination color space may then be output.

Figure 3:
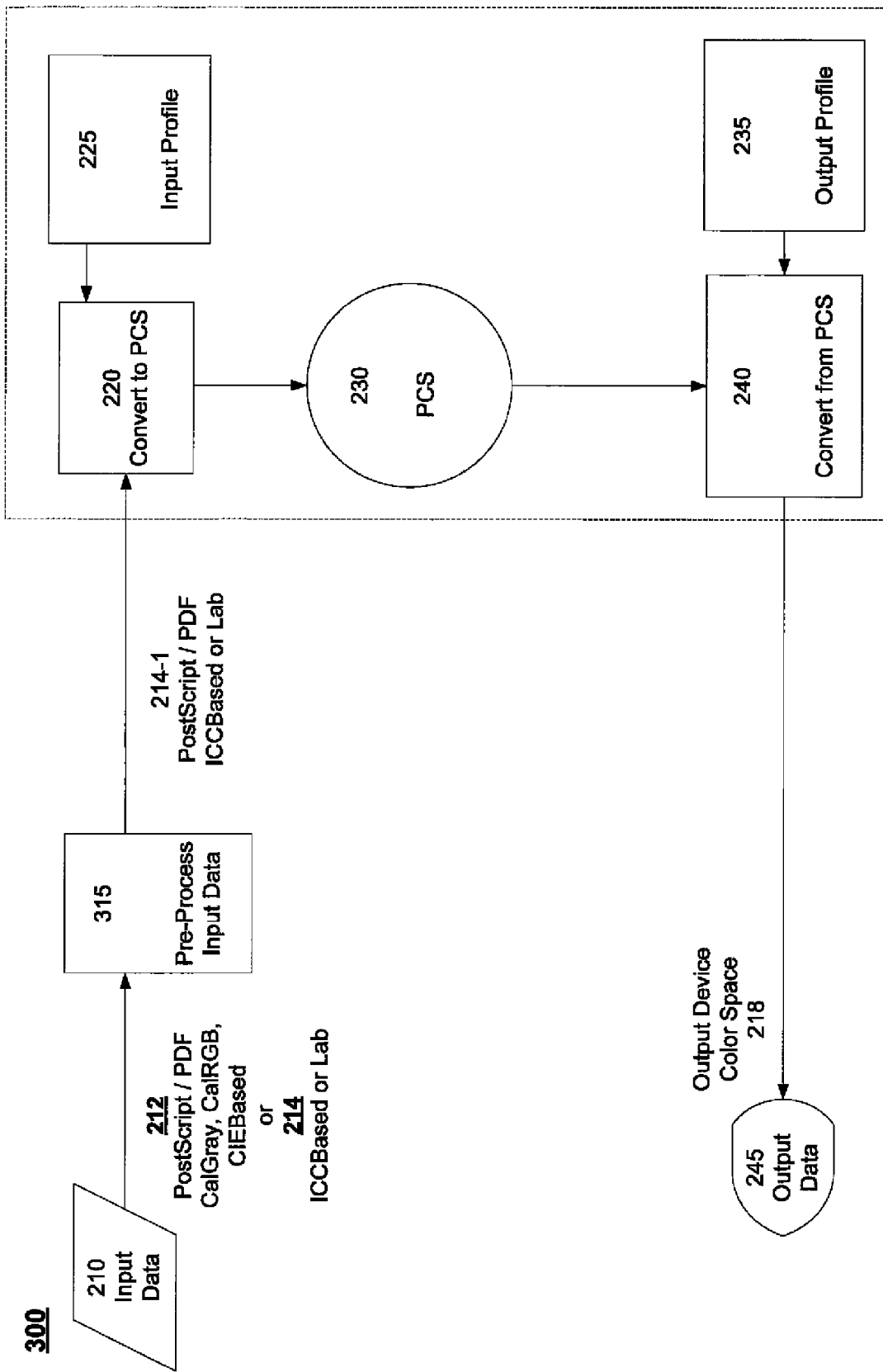
FIG. 3 shows a block diagram illustrating an exemplary data flow for color conversion in a system consistent with disclosed embodiments.

FIG. 3 shows a block diagram 300 indicating an exemplary data flow for color conversion in a system consistent with disclosed embodiments. In some embodiments, the various blocks may be implemented on system 100. In some embodiments, one or more blocks may be implemented on computer 110 and/or printer 100. For example, input data 210, which may be part of a PostScript™ or PDF™ document, may be sent to pre-processor module 315, which may be part of a printer driver for printer 170 running on computer 110. Modules 220 through 240 may be implemented in a printer. As another example, input data 210 may be generated by computer 110; pre-processor module 315 may be implemented on a print controller (not shown) for printer 170, while modules 220 through 240 may be implemented on printer 170. In general, the functional blocks (and functions within the blocks) may be distributed between computer 110, printer 170, and/or a print controller.

As shown in FIG. 3, input data 210, which may be in the form of a PDF or PostScript document, may be received by pre-processing module 315. In some embodiments, input data 210 may be sent from computer 110 to printer 170 or a print controller (not shown) coupled to printer 170. In some embodiments, pre-processing module 315 may form part of a print driver, or may be an add-on or extension invoked by the printer driver. Input data 210 may be in a variety of color spaces. For example, input data 210 may be specified as CalGray, CalRGB, or CIEBased color data 212, or ICCBased or Lab color data 214.

In some embodiments, pre-processing module 315 may process input data 210 based on the color space of input data 210. For example, pre-processing module 315 may perform a color space conversion of CalGray, CalRGB, or CIEBased (in PDF or PostScript) input data 212 to an ICCBased color space such as ICCGray or ICCRGB to generate the appropriate ICCBased data 214-1.

In some embodiments, if the input color space is already ICCBased, then pre-processing module 315 may send the ICCBased data 214-1 to color conversion module 220 without additional processing. Conversion of CalGray, CalRGB and other color spaces to ICCBased or Lab data 214-1 by pre-processing module 315 permits color conversion module 220 to convert input data 210 into PCS 230 by using stored input profile 225.

Thus, in embodiments where modules 220 through 240 are implemented in printer 170, a common processing pathway may be used to process a greater variety of color spaces. Consequently, code optimizations can be shared across the color spaces, a single code upgrade path may be implemented for code upgrades, and maintenance simplified. In some embodiments, input profile 225 may be stored in memory 172 or secondary storage 173 of printer 170 and/or in computing device 110. In some embodiments, input color profile 225 may include the detailed ICC specification of the input color space.

Data in PCS 230 may then be converted to output device color space 218 using color conversion module 240 and output profile 235. For example, data may be converted from CIE-XYZ, which may serve as PCS 230, to the output device color space 218, which can be CMYK for a printer. Output data 245 in the destination color space may then be output.

Figure 4:
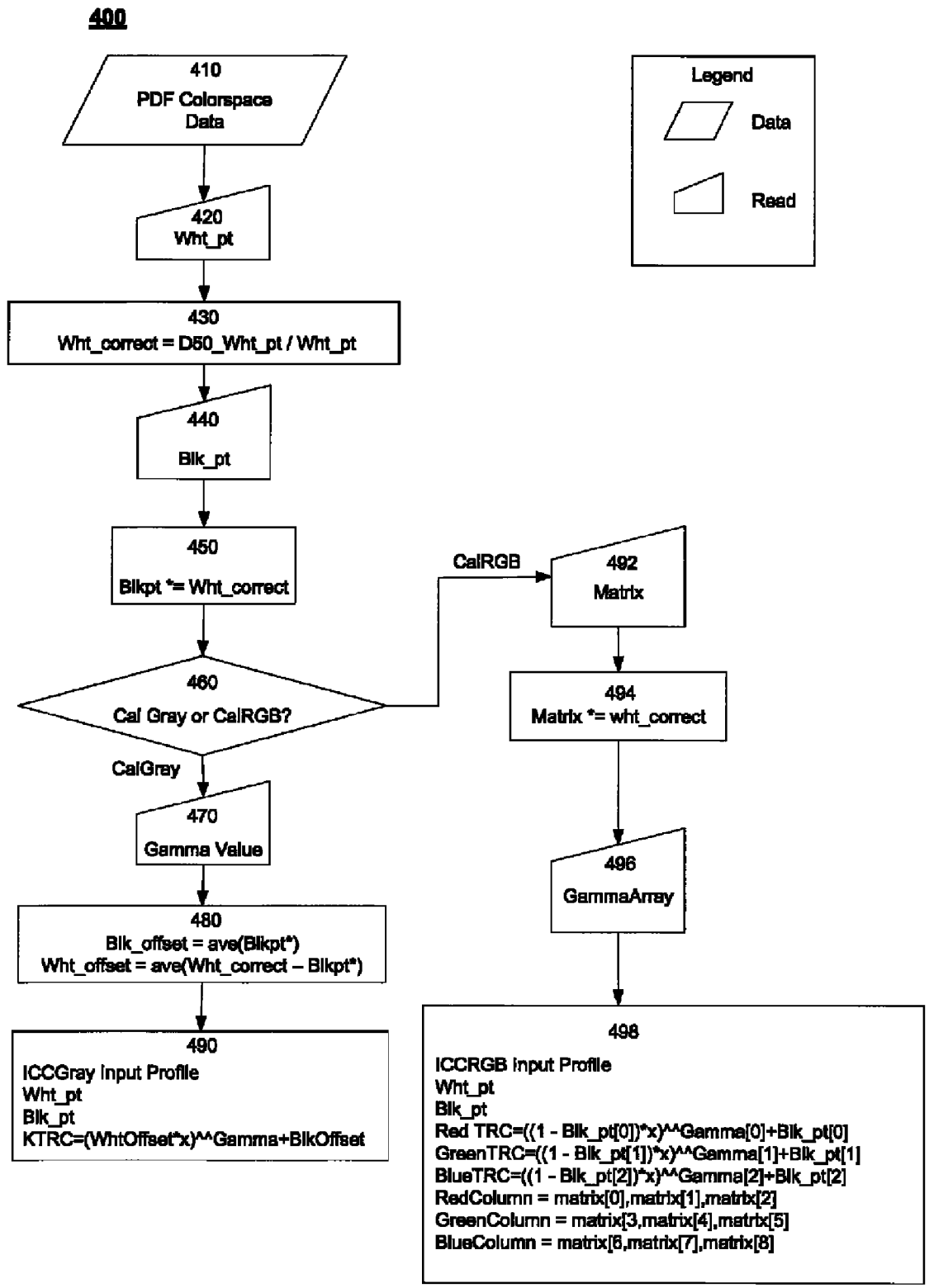
FIG. 4 shows a flowchart illustrating an exemplary method to permit the processing of exemplary CalGray and CalRGB color spaces using ICC profiles in a manner consistent with disclosed embodiments.

FIG. 4 shows a flowchart illustrating an exemplary method 400 to permit the processing of exemplary CalGray and CalRGB color spaces using ICC profiles in a manner consistent with disclosed embodiments. In some embodiments, exemplary method 400 may be implemented in pre-processing module 315, or provided as an add-on or plug-in to replace, modify, and/or augment pre-existing, manufacturer-provided, and/or baseline algorithms. Note that the description of exemplary method 400 in relation to the process flow in FIG. 3 is exemplary and for descriptive purposes only and that method 400 may be applied to other processes with suitable modifications as would be apparent to one of ordinary skill in the art.

In step 410, PDF color space data may be input, and the WhitePoint array (Wht_pt) may be read, in step 420, from the PDF color space data. A white point (or reference white or target white) is a set of tristimulus values or chromaticity coordinates that serve to define the color "white". The human eye has short, middle, and long wavelength receptors. Therefore, from the viewpoint of human perception, three parameters may be used to describe a color sensation. In a three-component additive color model, the tristimulus values for a color are the amounts of the three primary colors that result in a human visual match of that color as perceived by a "standard observer" under some specified standard lighting conditions. In the CIE 1931 color space, the tristimulus values are often denoted by the parameters X, Y, and Z.

Next, in step 430, a corrected white point array (Wht_correct) may be calculated by dividing the D50 white point XYZ values by the PDF "Cal" color space WhitePoint values. The D50 white point is an ICC standard illuminant, which is a published profile (corresponding to a spectrum of visible light) that permits images or colors recorded under different lighting conditions to be compared. The D series of illuminants, can be characterized mathematically, are constructed to model natural daylight. For a given standard illuminant, the white point is uniquely defined.

In step 450, a corrected black point array (Blkpt*) may be calculated using the PDF Cal color space BlackPoint (Blk_pt) array read in step 440. The black point is a reference point that defines the darkest part of an image. The corrected black point array may be adjusted by the previously calculated corrected white point array values.

In step 460, the algorithm determines if the data is specified in the CalGray or the CalRGB color spaces. In step 470, if the color space is PDF CalGray ("CalGray" in step 460) then the Gamma value may be read in (if present). Gamma or gamma correction refers to a nonlinear operation used to code and decode luminance or tristimulus values.

In step 470, a black offset (Blk_offset) is calculated as the average of the current adjusted black point (Blkpt*) values and a white offset (Wht_offset) is calculated by subtracting the corrected black point (Blkpt*) values from the average of the adjusted white point (Wht_correct) values.

Next, in step 490, an ICCGray Input Profile is generated. The ICCGray input profile includes the specified WhitePoint data and BlackPoint data. In addition, a "Type 2 parametricCurve" type data tag is written with gamma=Gamma, a=Wht_offset, b=0 and c=Blk_offset for Gray (K) Tone Reproduction Curve ("TRC"), or KTRC data.

In step 492, if the color space is PDF CalRGB ("CalRGB" in step 460) then values in a transformation matrix may be read. The Matrix values may be adjusted by matrix multiplying with corresponding corrected white point values in the Wht_correct array, in step 494. In step 496, the Gamma array may be read.

In step 498, an ICCRGB Input Profile is generated. The ICCRGB input profile includes the specified WhitePoint data and BlackPoint data. In addition, a "Type 2 parametricCurve Type" data tag is written with gamma=Gamma[0], a=1−Blk_pt[0], b=0 and c=Blk_pt[0] for Red (R)Tone Reproduction Curve ("TRC"), or RedTRC data; while a "Type 2 parametricCurve" type data tag is written with gamma=Gamma[1], a=1−Blk_pt[1], b=0 and c=Blk_pt[1] for the GreenTRC data; and a "Type 2 parametricCurve" type data tag is written with gamma=Gamma[2], a=1−Blk_pt[2], b=0 and c=Blk_pt[2] for the BlueTRC data; RedMatrixColumn data of {Matrix[0], Matrix[1] and Matrix[2]}; GreenMatrixColumn data of {Matrix[3], Matrix[4] and Matrix[5]}; and BlueMatrixColumn data of {Matrix[6], Matrix[7] and Matrix[8]}.

Similarly, the PostScript CIEBased color space dictionary information can be manipulated to produce an ICC profile for producing the specified ICCBased color space transformations. In some embodiments, the generated ICC profiles may be embedded within documents and images. By embedding the profile in documents, users can transparently move color data between different computers, networks, and operating systems. Printer 170 may use the embedded profile to perform color space conversions.

In some embodiments, algorithm 320 may be implemented on a print controller coupled to a printer that may pre-process input documents and generate the appropriate input profiles prior to sending the document to printer 170. In some embodiments, algorithm 320 may be implemented on computing device 110. In some embodiments, algorithm 320 may be implemented as a pre-processing front end on printer 170, so that input color data may be inspected and input profiles generated prior to processing the data using the generated profiles.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A processor-implemented method for processing at least one document comprising color data in a first color space, the method comprising the processor-implemented steps of:
   determining whether the color data is in a first standard color space characterized by a sequence of bytes in a standard profile format;
   if the color data is determined not to be in the first standard color space:
   inspecting the color data to determine if a first color space conversion operation for a portion of the color data is specified using at least one of a color space dictionary or a transformation matrix, wherein the first color space conversion operation converts the color data from the first color space to an intermediate standard color space; and
   converting the color data to the first standard color space if the first color space conversion operation is specified using at least one of the color space dictionary or the transformation matrix;
   generating an input profile corresponding to a second color conversion operation, wherein the input profile comprises information to convert color data from the first standard color space to the intermediate standard color space; and
   performing the second color space conversion operation on the color data in the first standard color space to the intermediate standard color space using the generated input profile.

2. The processor-implemented method of claim 1, wherein the method is implemented on a print controller coupled to a printer.

3. The processor-implemented method of claim 1, k wherein the method is implemented on a computer.

4. The processor-implemented method of claim 3, wherein the method is performed by a printer driver running on the computer.

5. The processor-implemented method of claim 1, wherein the generated input profile is embedded in the document.

6. The processor-implemented method of claim 1, wherein the document is a PDF or PostScript document.

7. The processor-implemented method of claim 6, wherein the color data is specified in one of CalGray or CalRGB.

8. The processor-implemented method of claim 6, wherein the intermediate standard color space is CIE-XYZ.

9. The processor-implemented method of claim 1, wherein the method is implemented using a pre-processing front end on a printer.

10. The processor-implemented method of claim 9, wherein the standard intermediate standard color space corresponds to the profile connection space used by the printer.

11. The processor-implemented method of claim 1, wherein the generated profile is an ICC profile.

12. A non-transitory computer-readable medium that contains instructions which, when executed by a processor, perform steps in a method for processing at least one document comprising color data in a first color space, the method comprising the steps of:
   determining whether the color data is in a first standard color space characterized by a sequence of bytes in a standard profile format;
   if the color data is determined not to be in the first standard color space:
   inspecting the color data to determine if a first color space conversion operation for a portion of the color data is specified using at least one of a color space dictionary or a transformation matrix, wherein the first color space conversion operation converts the color data from the first color space to an intermediate standard color space; and
   converting the color data to the first standard color space if the first color space conversion operation is specified using at least one of the color space dictionary or the transformation matrix;
   generating an input profile corresponding to a second color conversion operation, wherein the input profile comprises information to convert color data from the first standard color space to the intermediate standard color space; and
   performing the second color space conversion operation on the color data in the first standard color space to the intermediate standard color space using the generated input profile.

13. The non-transitory computer-readable medium of claim 12, wherein the method is implemented on a print controller coupled to a printer.

14. The non-transitory computer-readable medium of claim 12, wherein the method is implemented on a computer.

15. The non-transitory computer-readable medium of claim 14, wherein the method is performed by a printer driver running on the computer.

16. The non-transitory computer-readable medium of claim 12, wherein the generated profile is embedded in the document.

17. The non-transitory computer-readable medium of claim 12, wherein the document is a PDF or PostScript document.

18. The non-transitory computer-readable medium of claim 17, wherein the color data isi specified in one of CalGray, CalRGB, or CIEBased.

19. The non-transitory computer-readable medium of claim 17, wherein the intermediate standard color space is CIE-XYZ.

20. The non-transitory computer-readable medium of claim 12, wherein the method is implemented using a pre-processing front end on a printer.

21. The non-transitory computer-readable medium of claim 20, wherein the standard intermediate standard color space corresponds to the profile connection space used by the printer.

22. The non-transitory computer-readable medium of claim 12, wherein the generated profile is an ICC profile.

* * * * *